United States Patent [19]

Patel

[11] Patent Number: 5,041,294

[45] Date of Patent: Aug. 20, 1991

[54] SORBITOL-MODIFIED FLAVOR

[75] Inventor: Mansukh M. Patel, Downers Grove, Ill.

[73] Assignee: Wm. Wrigley Jr. Company, Chicago, Ill.

[21] Appl. No.: 513,796

[22] Filed: Apr. 24, 1990

[51] Int. Cl.⁵ .............................................. A23G 3/30
[52] U.S. Cl. ........................................ 426/3; 426/650; 426/651; 426/533; 426/534; 426/330; 426/330.6; 424/48
[58] Field of Search ........................................ 426/3–6, 426/650, 651, 534, 533, 321, 330, 330.6; 424/48

[56] References Cited

U.S. PATENT DOCUMENTS

| | | | |
|---|---|---|---|
| 3,314,803 | 4/1967 | Dame et al. | 426/651 |
| 3,821,417 | 6/1974 | Westall et al. | 426/3 |
| 4,163,803 | 8/1979 | Goldscher | 426/651 |
| 4,263,327 | 4/1981 | Pedersen et al. | 426/3 |
| 4,385,071 | 5/1983 | Yakimischak | 426/3 |
| 4,388,328 | 6/1983 | Glass | 426/3 |
| 4,582,716 | 4/1986 | Pickup et al. | 426/651 |
| 4,613,513 | 9/1986 | Hussein | 426/651 |

*Primary Examiner*—Jeanette Hunter
*Attorney, Agent, or Firm*—Willian Brinks Olds Hofer Gilson & Lione

[57] ABSTRACT

A method of treating flavors comprising spearmint is provided by the instant disclosure. The method comprises mixing the flavor oil with an alditol comprising sorbitol for a time sufficient to modify the flavor by reducing its harshness and separating the modified flavor from the alditol.

21 Claims, No Drawings

SORBITOL-MODIFIED FLAVOR

BACKGROUND OF THE INVENTION

The present invention relates to a method of treating spearmint flavors so as to eliminate the undesirable off-notes occasionally associated therewith when such flavors are utilized in confectionary or medicinal products. More particularly, the present invention relates to a method of treating flavors and flavor blends having spearmint flavor or being blended with spearmint.

Flavors having spearmint as a component may exhibit undesirable off-notes of varying intensity which have been characterized as being dirty, heavy, harsh, acid, woody and sour-like. It has been postulated that these flavors contain an impurity which is responsible for the undesirable off-notes occasionally associated therewith.

Regardless of the cause of the undesirable off-notes manifested by such flavors, it has unexpectedly been discovered that mixing the flavor with an alditol eliminates the undesirable off-notes associated therewith without otherwise adversely affecting the flavor.

SUMMARY OF THE INVENTION

In accordance with one embodiment of the present invention, there is provided a method of manufacturing a chewing gum having a flavor comprising spearmint wherein the chewing gum is free of the undesirable off-notes sometimes associated with products incorporating spearmint-based flavors. The method comprises mixing the flavor with an alditol to modify the flavor by reducing the off-notes, whereupon the modified flavor is mixed with the chewing gum so that the flavor comprises from about 0.1% to about 10% by weight of the chewing gum.

In accordance with another embodiment of the present invention, there is provided a method of treating a flavor comprising spearmint so as to eliminate the undesirable off-notes associated therewith. This method comprises mixing the flavor with an alditol for a time sufficient to reduce the off-notes to an unnoticeable level.

While not wishing to be bound by any particular theory, the Applicant suggests that sorbitol, because of its surface morphology and possibly other factors, selectively adsorbs or absorbs some of the "harsh" flavor components and thus renders the flavor more acceptable sensorially. However, the Applicant has not been able to exclude the possibility that an unidentified catalytic reaction may also be contributing to the change in the flavor oil during exposure to the alditol.

DETAILED DESCRIPTION OF PREFERRED EMBODIMENTS

The method of the present invention contemplates the treatment of any flavor or flavor blend comprising spearmint or blends thereof. The present invention contemplates the blending of the aforesaid flavor with any other flavor of food-acceptable quality, with the subsequent treatment of the resulting blend according to the method of the present invention. Examples of flavors which may be blended with spearmint and subsequently treated according to the method of the present invention include essential oils, synthetic flavors, or mixtures thereof, including but not limited to, oils derived from plants and fruits such as citrus oils, fruit essences, peppermint oil, methyl salicylate, clove oil, anise and the like. Artificial flavoring components are also contemplated for blending with spearmint and subsequent treatment according to the method of the present invention. Those skilled in the art will recognize that natural and artificial flavors may be combined with spearmint containing flavors in any manner. All such flavors and blends are contemplated for use in the method of the present invention.

In accordance with the method of the present invention, the flavor is mixed with the alditol. The solution should be sufficiently concentrated so as to efficiently remove the unwanted impurities responsible for the undesirable off-notes.

Various solutions are contemplated for use in the method of the present invention. Examples of such combinations include sorbitol, mannitol, xylitol, lactitol and hydrogenated isomaltulose. Preferably sorbitol would be mixed with the flavor oil. The amount of alditol necessary to reduce the off-notes may vary. It may vary with the alditol selected or with the flavor oil to be modified. Preferably, the alditol would be present at a concentration of at least about 10%. More preferably, the alditol would be present at a concentration of at least about 20 weight percent. Most preferably, the alditol would be present at a concentration of at least about 25 weight percent.

The flavor may be mixed with the alditol pursuant to any method known by those skilled in the art. For example, the mixing can be carried out on a small scale by gently shaking the beaker containing the flavor oil and the alditol.

After mixing, the residual alditol in the flavor mixture may be removed by any means of physical separation known by those skilled in the art. Preferably, the residual alditol would be removed before adding the flavor oil to chewing gum or any other confectionary product to which it is to be introduced. Because the undissolved alditol settles to the bottom of the container, most of the flavor oil can be decanted with little difficulty. The remainder of the flavor oil could be obtained by centrifugation or by filtration. Any commercially available centrifuge known in the art is contemplated for use in the method of the present invention. Any filtering method known by those skilled in the art is contemplated for use in the method of the present invention. Such methods include, for example, gravity filtration, vacuum filtration, and pressure filtration through suitable filter media. In some cases it may be desirable to use both methods of removing residual alditol. In these cases, the modified flavor should be decanted first, then filtered as described above.

The treated flavor is then ready for use in all types of confectionary and medicinal products. A presently preferred use for the flavor treated according to the method of the present invention is the incorporation of the treated flavor into chewing gum. The treated flavor may be mixed with the chewing gum ingredients at any time during the manufacturing process.

In general, a chewing gum composition comprises a water soluble bulk portion, a water insoluble chewable gum base portion, and typically water insoluble flavors. The water-soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include paraffin, microcrystalline, and natural waxes such as beeswax and carnauba. The insoluble gum base constitutes between about 5 and about 95 weight percent of the gum. Preferably, the insoluble gum base comprises about 10 to about 50 weight percent of the gum, and more preferably about 20 to about 30 weight percent.

The gum base typically also includes a filler component. The filler component may be calcium carbonate, magnesium carbonate, talc, dicalcium phosphate, and the like. The filler may constitute between about 5 to about 60 weight percent of the gum base. Preferably, the filler comprises about 5 to about 50 weight percent of the chewing gum base. The gum base typically also contains softeners, including glycerol monostearate and glycerol triacetate. Further, gum bases may also contain optional ingredients such as antioxidants, colors and emulsifiers. The present invention contemplates employing any commercially acceptable gum base. The water-soluble portion of chewing gum may further comprise softeners, sweeteners, flavors and combinations thereof. The softeners are added to the chewing gum in order to optimize the chewability and mouth feel of the gum. Softeners, also known in the art as plasticizers or plasticizing agents, generally constitute between about 0.1 to about 15 weight percent of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in gum.

Sweeteners contemplated by the present invention for use in chewing gum include both sugar and sugarless components. Sugar sweeteners generally include saccharide-containing components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars and comprise but are not limited to sugar alcohols such as sorbitol, mannitol, xylitol, hydrogenated starch hydrolysates, maltitol and the like, alone or in any combination. Also contemplated for direct addition to the gum are high-intensity sweeteners such as aspartame, sucralose, acesulfame-K, alitame and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as an aqueous sweetener solution.

The treated flavor can be used in a chewing gum in amounts of about 0.1 to about 10 weight percent, and preferably from about 0.5 to about 3 weight percent of the gum. Flavors contemplated by the present invention include any liquid flavoring which is of food acceptable quality. More precisely, the present invention contemplates the use of flavors of food acceptable quality that contain at least in part either natural or artificial spearmint oil and blends thereof. The aforesaid flavor may be blended with other essential oils, synthetic flavors, or mixtures thereof, including but not limited to oils derived from plants and fruits such as citrus oils, fruit essences, peppermint oil, clove oil, methyl salicylate, anise, and the like. Artificial flavoring components are also contemplated by the present invention. Those skilled in the art will recognize that the natural and artificial flavors may be combined in any manner.

Ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. It is to be understood that under proper conditions, the treated flavor of the present invention may be added at any time during the gum manufacturing process. The entire mixing procedure typically takes from about 5 minutes to about 15 minutes, but longer mixing times may sometimes be required.

Those skilled in the art will recognize that variations of the above-described procedure may be followed. It is to be understood that an equivalent of changes and modifications of the embodiments described above are also contemplated by the present invention. The following examples are not to be construed as limitations upon the present invention, but are included merely as an illustration of the various embodiments.

EXAMPLES

Example 1

Into a glass, one-ounce bottle, 5 grams of sorbitol was weighed. Next 15 grams of spearmint flavor was added to the sorbitol. The bottle was capped and shaken for approximately one minute. About 25% of the volume of the bottle was deadspace.

The capped mixture was held at room temperature for 72 hours.

After 3 days the aroma was judged to be lighter and less harsh than untreated spearmint in a blind test.

Example 2

Using the same procedure as in Example 1, less sorbitol (2.5 grams) was added to 15 grams of spearmint flavor. The aroma was judged to be heavier than that of Example 1, but better than control flavor.

Example 3

Using the same procedure as in Example 1, more sorbitol (10 grams) was added to 15 of spearmint flavor. The aroma was judged to be light and slightly harsh.

Example 4

Using the same procedure as in Example 1, 3.75 grams sorbitol and 1.25 grams calcium carbonate were mixed with 15 grams spearmint flavor. The aroma was judged to be sweet and light.

Example 5

Using the same procedure as in Example 1, 5 grams sorbitol having been passed through a U.S. standard sieve #100 was added to 15 grams spearmint flavor. The aroma was judged to be sweet and light.

Example 6

Using the same procedure as in Example 1, except that the mixture was only stored 4 hours, a ⅓ ratio of sorbitol to flavor (spearmint) was prepared. The aroma was judged to be unchanged.

Example 7

Using the same procedure as in Example 6, a 1/5.25 ratio of sorbitol to flavor was prepared and stored 4 hours. The aroma was judged to be unchanged.

Example 8

Using the same procedure as in Example 6, a 1/11.25 ratio of sorbitol to flavor was prepared and stored 4 hours. The aroma was judged to be unchanged.

Example 9

Using the same procedure as in Example 6, a ⅓ ratio of sorbitol to flavor (spearmint) was prepared and stored 24 hours. The aroma was judged to be light.

Example 10

Using the same procedure as in Example 6, a 1/5.25 ratio of sorbitol to flavor was prepared and stored 24 hours. The aroma was judged to be lighter.

Example 11

Using the same procedure as in Example 6, a 1/11.5 ratio of sorbitol to flavor was prepared and stored 24 hours. The aroma was judged to be unchanged.

Example 12

Using the same procedure as in Example 6, a ⅓ ratio of sorbitol to flavor was prepared and stored 16 hours. The aroma was judged to be lighter.

Example 13

Using the same procedure as in Example 6, a 1/5.25 ratio of sorbitol to flavor was prepared and stored 16 hours. The aroma was judged to be lighter.

Example 14

Using the same procedure as in Example 6, a 1/4.5 ratio of sorbitol to flavor was prepared and stored 16 hours. The aroma was judged to be unchanged.

EFFECT OF TEMPERATURE

The preceding data were developed at room temperature (approximately 70° F.). Additional experiments were undertaken at 85° and 100° F.

Example 15

Using the same procedure as in Example 6, a ⅓ ratio of sorbitol to flavor was prepared and stored 24 hours at 85° F. The aroma was judged to be lighter.

Example 16

Using the same procedure as in Example 6, a ⅓ ratio of sorbitol to flavor was prepared and stored 4 hours at 85° F. The aroma was judged to be unchanged.

Example 17

Using the same procedure as in Example 6, a 1/5.25 ratio of sorbitol to flavor was prepared and stored 24 hours at 85° F. The aroma was judged to be unchanged.

Example 18

Using the same procedure as in Example 6, a ⅓ ratio of sorbitol to flavor was prepared and stored 24 hours at 100° F. The aroma was judged to be lighter.

Example 19

Using the same procedure as in Example 6, a ⅓ ratio of sorbitol to flavor was prepared and stored 4 hours at 100° F. The aroma was judged to be unchanged.

Example 20

Using the same procedure as in Example 6, 1/5.25 ratio of sorbitol to flavor was prepared and stored 24 hours at 100° F. The aroma was judged to be lighter.

COMPARATIVE USE OF ALDITOLS

In a separate experiment, sorbitol A was compared with xylitol and mannitol. Three different mixtures were prepared in which the alditol-to-spearmint oil weight ratio was one-to-three. The mixtures were vigorously agitated and then incubated at room temperature for 24 hours. The flavors mixed with xylitol and mannitol formed a thicker slurry than did the flavor mixed with sorbitol.

GUM FORMULATION

Any of the preceding modified spearmint formulas may be used in the following chewing gum composition, which is only one example of many different possible gum formulations:

| Ingredient | % by weight in the final composition |
| --- | --- |
| Sugar | 56.15 |
| Base | 2.0 |
| Corn Syrup | 5.1 |
| Glycerin | 2.0 |
| Flavor | 1.35 |
| Dextrose | 13.4 |
|  | 100% |

The precise gum formula employed is not critical to this invention. Flavor levels also may vary. The present invention may be used in sugar or sugarless formulas. Mixing schedules of gum manufacture may be varied.

We claim:

1. A method of manufacturing a chewing gum comprising the following steps:
   providing a flavor with undesirable harshness;
   providing an alditol which is capable of reducing the harshness of a flavor;
   mixing the flavor with the alditol for a time sufficient to modify the flavor by reducing said harshness;
   separating the modified flavor from the alditol; and
   mixing the modified flavor with the chewing gum ingredients so that the flavor comprises from about 0.1% to about 10% by weight of the chewing gum.

2. The method of claim 1 wherein the flavor constituent comprises spearmint.

3. The method of claim 1 wherein the alditol comprises a sugar alcohol selected from the group consisting of sorbitol, mannitol, xylitol, hydrogenated isomaltulose, lactitol and mixtures thereof.

4. The method of claim 1 wherein said time is at least 6 hours.

5. The method of claim 1 wherein the flavor comprises about 0.5 to 3% by weight of the chewing gum.

6. The method of claim 1 wherein said separating step comprises filtration.

7. The method of claim 1 wherein said separating step comprises decanting.

8. The method of claim 1 wherein said separating step comprises centrifugation.

9. The method of claim 1 wherein the step of mixing the flavor with the alditol comprises adding at least about 10% by weight of alditol.

10. The method of claim 1 wherein the step of mixing the flavor with the alditol comprises adding at least about 20% by weight of alditol.

11. The method of claim 1 wherein the step of mixing the flavor with the alditol comprises adding at least about 25% by weight of alditol.

12. A method of manufacturing an oral composition comprising the following steps:
providing a flavor with undesirable harshness;
providing an alditol which is capable of reducing the harshness of a flavor;
mixing the flavor with the alditol for a time sufficient to modify the flavor by reducing said harshness;
separating the modified flavor from the alditol;
providing the ingredients of the oral composition; and
mixing the modified flavor with the ingredients of the oral composition so that the flavor comprises from about 0.1% to about 10% by weight of the oral composition.

13. The method of claim 12 wherein the flavor constituent comprises spearmint.

14. The method of claim 12 wherein the alditol comprises a sugar alcohol selected from the group consisting of sorbitol, mannitol, xylitol, hydrogenated isomaltulose, lactitol and mixtures thereof.

15. The method of claim 12 wherein said time is at least 6 hours.

16. The method of claim 12 wherein said separating step comprises filtration.

17. The method of claim 12 wherein said separating step comprises decanting.

18. The method of claim 12 wherein said separating step comprises centrifugation.

19. The method of claim 12 wherein the step of mixing the flavor with the alditol comprises adding at least about 10% by weight of alditol.

20. The method of claim 12 wherein the oral composition comprises a food.

21. The method of claim 12 wherein the oral composition comprises a drug.

* * * * *